US012728877B2

(12) United States Patent
Kim et al.

(10) Patent No.: US 12,728,877 B2
(45) Date of Patent: Sep. 8, 2026

(54) METHOD AND SYSTEM FOR RECOMMENDING VEHICLE CONTROL MODE BASED ON VEHICLE SITUATION

(71) Applicants: Hyundai Motor Company, Seoul (KR); Kia Corporation, Seoul (KR)

(72) Inventors: Do Hwa Kim, Seoul (KR); Sung Il Jung, Busan (KR); Dae Yeong Kim, Hwaseong-si (KR); Tae Hyun Lee, Yongin-si (KR); Sung Bae Jeon, Hwaseong-si (KR); Yong Joo Lee, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 85 days.

(21) Appl. No.: 18/811,584

(22) Filed: Aug. 21, 2024

(65) Prior Publication Data

US 2025/0229795 A1 Jul. 17, 2025

(30) Foreign Application Priority Data

Jan. 11, 2024 (KR) ........................ 10-2024-0004884

(51) Int. Cl.
*B60W 20/00* (2016.01)
*B60W 50/14* (2020.01)
*G07C 5/00* (2006.01)

(52) U.S. Cl.
CPC ............. *B60W 50/14* (2013.01); *G07C 5/008* (2013.01)

(58) Field of Classification Search
CPC ............................... B60W 50/14; G07C 5/008
See application file for complete search history.

(56) References Cited

U.S. PATENT DOCUMENTS

2008/0211779 A1* 9/2008 Pryor .................... G06F 3/0425 345/173
2009/0301796 A1* 12/2009 Wedderburn, Jr. ..... F03D 13/10 180/2.2
2016/0009296 A1* 1/2016 Iguchi .................. B60W 50/14 701/31.4
2016/0104486 A1 4/2016 Penilla et al.
2018/0046185 A1* 2/2018 Sato ..................... G05D 1/0088
2020/0152197 A1 5/2020 Penilla et al.
2024/0416877 A1* 12/2024 Hattori .................. B60W 40/02

FOREIGN PATENT DOCUMENTS

CN 111196151 A 5/2020
JP 2019-515822 A 8/2017
KR 10-2016-0145719 A 12/2016
KR 10-1995892 B1 6/2019
KR 10-2019-0085962 A 7/2019

* cited by examiner

*Primary Examiner* — Dalena Tran
(74) *Attorney, Agent, or Firm* — MORGAN, LEWIS & BOCKIUS LLP

(57) ABSTRACT

In a method and a system for recommending a vehicle control mode based on a vehicle situation, the method of recommending a vehicle control mode includes receiving satiation information collected from a vehicle for a predetermined time period, based on a data list generated by the vehicle, determining a problem situation of the vehicle, based on the collected situation information, and selecting a control mode that matches the problem situation of the vehicle from among a plurality of pre-stored control modes and transmitting the selected control mode to the vehicle.

20 Claims, 6 Drawing Sheets

100
105
communication unit (130)
input/output interface (110)
120
vehicle controller (123)
information collector (121)
150
communication unit (160)
database (180)
170
situation determiner (171)
control mode determiner (173)
virtual experience provider (175)
reward provider (177)

FIG. 5

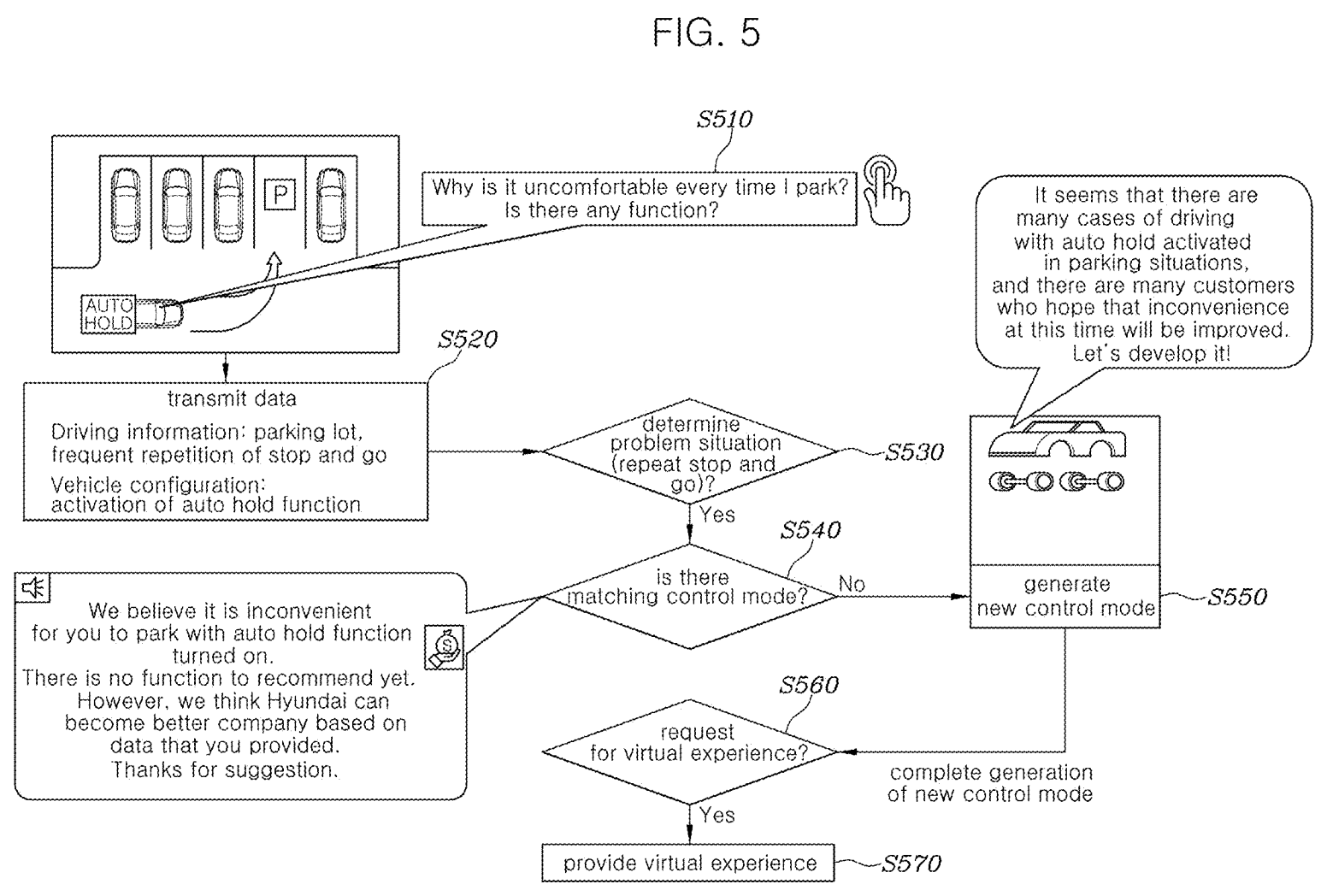

S510
Why is it uncomfortable every time I park? Is there any function?
AUTO HOLD
P
S520
transmit data
Driving information: parking lot, frequent repetition of stop and go
Vehicle configuration: activation of auto hold function
S530
determine problem situation (repeat stop and go)?
Yes
S540
is there matching control mode?
No
We believe it is inconvenient for you to park with auto hold function turned on. There is no function to recommend yet. However, we think Hyundai can become better company based on data that you provided. Thanks for suggestion.
S550
generate new control mode
It seems that there are many cases of driving with auto hold activated in parking situations, and there are many customers who hope that inconvenience at this time will be improved. Let's develop it!
complete generation of new control mode
S560
request for virtual experience?
Yes
S570
provide virtual experience

METHOD AND SYSTEM FOR RECOMMENDING VEHICLE CONTROL MODE BASED ON VEHICLE SITUATION

CROSS-REFERENCE TO RELATED APPLICATION

The present application claims priority to Korean Patent Application No. 10-2024-0004884, filed on Jan. 11, 2024, the entire contents of which is incorporated herein for all purposes by this reference.

BACKGROUND OF THE PRESENT DISCLOSURE

Field of the Present Disclosure

The present disclosure relates to an autonomous driving technology, and more particularly, to a method and a system for recommending a vehicle control mode based on a vehicle situation.

Description of Related Art

Recently, as the standard of living has improved and vehicle culture has become common, the time that passengers stay inside the vehicle has gradually increased due to long-distance driving for travel or traffic jams. Accordingly, various convenience facilities and convenience services are provided inside the vehicle for convenience of passengers staying inside the vehicle for a long time period.

A representative service of the convenience services is a telematics service. Telematics is a term that combines telecommunication and informatics, and is defined as a next-generation information provision service for vehicles through combination of IT industries and automotive industries where wireless communication, vehicles, terminals, content, and the like are systematically related.

The conventional telematics service utilizes wireless communication technology and satellite positioning system (global positioning system (GPS)) technology to provide, through a terminal within the vehicle, various services such as traffic and driving information, emergency handling information, remote vehicle diagnosis service and Internet, e-mail, life information, entertainment, and the like. Furthermore, as content which may be consumed while driving becomes more diverse, there is a trend of expanding to an integrated vehicle platform for providing content such as music and radio while driving.

In this regard, generally when a user inputs destination information and selects an autonomous driving mode, a terminal for vehicle obtains and displays first safety degree information to the destination. However, information on vehicle situations, such as rolling of the vehicle which may occur during autonomous driving, is only unilaterally notified to passengers.

Therefore, in the present field of the present disclosure, there is a demand for technology that informs the user of information on the vehicle situation, recommends a vehicle control function which may be helpful for the corresponding situation, and allows the user to determine whether to apply the recommended vehicle control technology.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and an apparatus for recommending a vehicle control mode based on a vehicle situation to inform a user of information on a vehicle situation and recommend a vehicle control function which may be helpful for the corresponding situation.

Another aspect of the present disclosure is to provide a method and an apparatus for recommending a vehicle control mode based on a vehicle situation to allow the user to determine whether to apply the recommended vehicle control technology.

The technical subjects of the present disclosure may not be limited to the above-mentioned technical subjects, and other technical subjects intended by the present disclosure may be clearly understood, through the following descriptions, by those skilled in the art to which the present disclosure pertains.

A method of recommending a vehicle control mode according to an exemplary embodiment of the present disclosure to solve the problem includes receiving satiation information collected from a vehicle for a predetermined time period, based on a data list generated by the vehicle, determining a problem situation of the vehicle, based on the collected situation information, and selecting a vehicle control mode that matches the problem situation of the vehicle from among a plurality of pre-stored vehicle control modes and transmitting the selected vehicle control mode to the vehicle.

The data list may include a driving path of the vehicle, main data of the vehicle, and information on a controller version of the vehicle.

The method of recommending the vehicle control mode may further include, in case that it is not possible to determine the problem situation of the vehicle, changing the data list and transmitting the changed data list to the vehicle.

The method of recommending the vehicle control mode may further include, in case that there is no vehicle control mode that matches the problem situation of the vehicle in the plurality of pre-stored vehicle control s, generating a new vehicle control mode.

The new vehicle control mode may be generated by receiving a process for a control procedure of the vehicle configured for solving the problem situation of the vehicle from a user.

In the method of recommending the vehicle control mode, in case that a request for virtual experience related to the matching vehicle control mode is received from a user, information for the virtual experience may be provided in response thereto.

The data list may be generated based on a region in which the vehicle is running, a type of the vehicle, and current season and weather.

Meanwhile, a server for providing information according to an exemplary embodiment of the present disclosure includes a communication unit configured to receive situation information collected from a vehicle for a predetermined time period, based on a data list generated by the vehicle and a processor configured to determine a problem situation of the vehicle, based on the collected situation information, and select a vehicle control mode that matches the problem situation of the vehicle from among a plurality of pre-stored vehicle control modes.

The data list may include a driving path of the vehicle, main data of the vehicle, and information on a controller version of the vehicle.

The processor may be configured to, in case that it is not possible to determine the problem situation of the vehicle, change the data list and transmit the changed data list to the vehicle.

The processor may be configured to, in case that there is no vehicle control mode that matches the problem situation of the vehicle in the plurality of pre-stored vehicle control modes, generate a new vehicle control mode.

The new vehicle control mode may be generated by receiving a process for a control procedure of the vehicle configured for solving the problem situation of the vehicle from a user.

The processor may be configured to, in case that a request for virtual experience related to the matching vehicle control mode is received from a user, provide information for the virtual experience in response thereto.

The data list may be generated based on a region in which the vehicle is running, a type of the vehicle, and current season and weather.

According to various embodiments of the present disclosure as described above, it is possible to secure customers by allowing a user to actively apply vehicle control technology according to a vehicle situation.

The user can apply or release a desired function at a desired time point.

It is possible to increase customer satisfaction by securing various pieces of driving data of drivers and using the same to develop the technology.

Furthermore, it is possible to provide enjoyment by allowing the user to virtually experience functions selected by the user.

Furthermore, it is possible to generate additional income by providing a new function of the vehicle.

Advantageous effects of the present disclosure may not be limited to the above-mentioned effects, and other effects which are not mentioned may be clearly understood, through the following descriptions, by those skilled in the art to which the present disclosure pertains.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5 illustrates another example in which the vehicle control mode recommendation method based on the vehicle driving condition is implemented according to an exemplary embodiment of the present disclosure.

Figure 1:
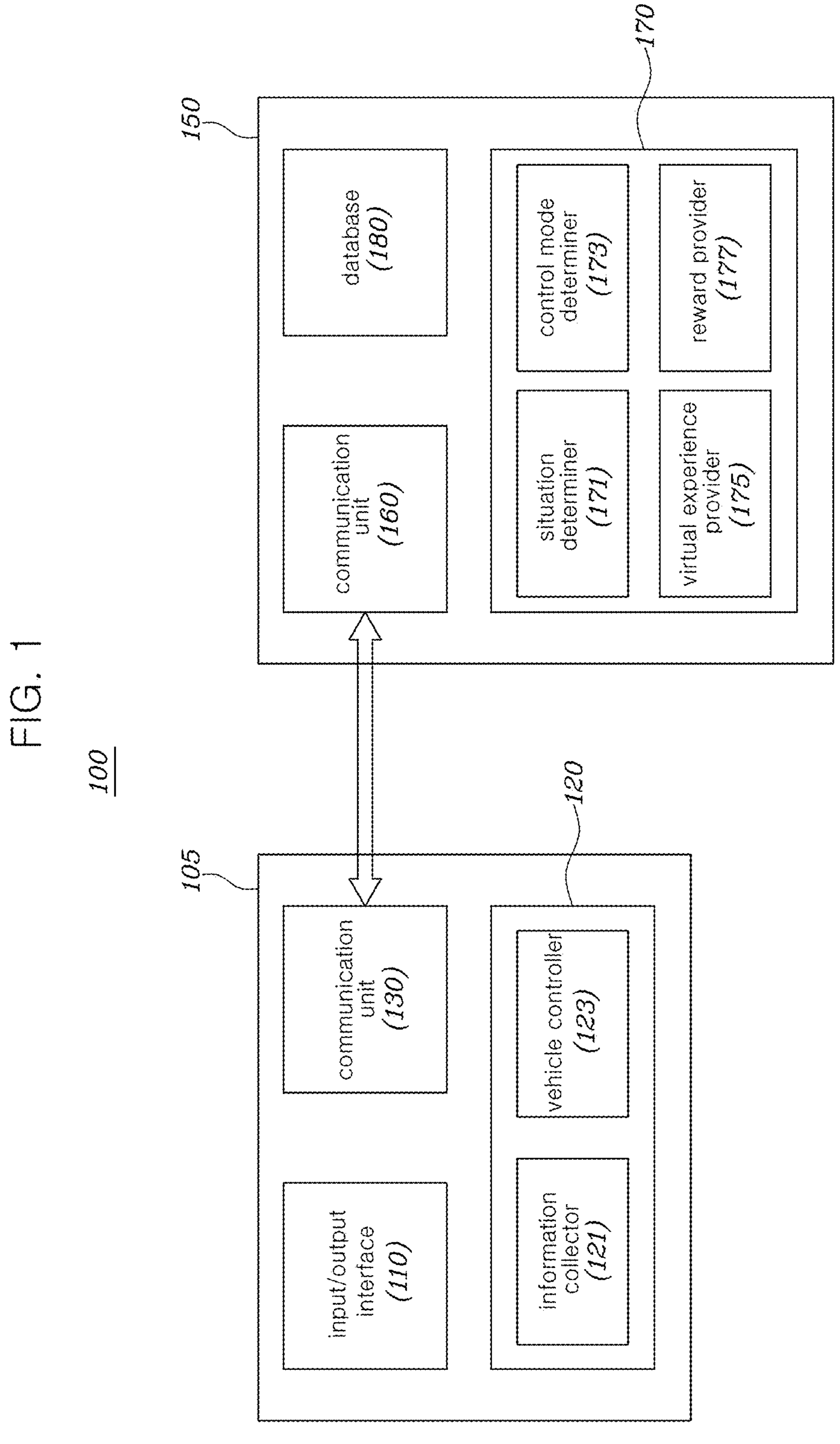
FIG. 1 is a block diagram illustrating the structure of a vehicle control mode recommendation system based on a vehicle situation according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the present specification will be described in detail with reference to the accompanying drawings, and the same or similar elements are provided the same and similar reference numerals, so duplicate descriptions thereof will be omitted. The terms "module" and "unit" used for the elements in the following description are provided or interchangeably used in consideration of only the ease of writing the specification, and do not have distinct meanings or roles by themselves. In describing the exemplary embodiments included in the present specification, when the detailed description of the relevant known technology is determined to unnecessarily obscure the gist of the present disclosure, the detailed description may be omitted. Furthermore, the accompanying drawings are provided only for easy understanding of the exemplary embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "comprise", "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

FIG. 1 is a block diagram illustrating the structure of a vehicle control mode recommendation system based on a situation of a vehicle according to an exemplary embodiment of the present disclosure.

Referring to FIG. 1, a vehicle control mode recommendation system 100 according to the exemplary embodiment includes a vehicle control device 105 and an information provision server 150.

The control vehicle device 105 may be provided within the vehicle.

The vehicle control device 105 collects information on a driving environment on the road, the vehicle, and passengers to provide a customized vehicle control mode according to a situation of the vehicle, transmit the collected information to the server 150, and is configured to control the vehicle according to the vehicle control mode received from the server 150.

The vehicle control device 105 includes an input/output interface 110, a processor 120, and a communication unit 130.

The input/output interface 110 receives a user input for collecting information on the driving environment on the road, the vehicle, and a driver and starting or ending transmission of the information to the information provisions server 150.

For example, the input/output interface 110 may include a physical button for receiving a start time point and an end time point of data to be transmitted to the information provision server 150 or a virtual button within a display screen.

At the present time, the physical button may be a physical button including a fingerprint recognition function.

The processor 120 is configured to perform all control and calculation operations of the vehicle control device 105 and includes an information collector 121 and a vehicle controller 123.

The information collector 121 may be configured to generate a data list for determining road and driving information and collects vehicle situation information, based on the data list.

With respect to the list, a new data list may be generated according to a region in which the vehicle is running, a vehicle type of the vehicle, and the current season and weather.

For example, the list may include an external temperature of the vehicle, altitude of the road on which the vehicle is currently running, a type of the vehicle (truck, bus, SUV, or the like), and weather information such as rain, snow, wind, or the like.

Furthermore, the data list may include a driving path of the vehicle, main data of the vehicle, and information on a controller version of the vehicle.

The information collector 121 may receive information on a region in which the vehicle is running, a traffic condition of a road on which the vehicle is running, and the current season and weather from a map server, a traffic information server, a weather information server, or the like through the communication unit 130.

The information collector 121 may select data to be transmitted to the information provision server 150 from among the collected information.

When receiving a start time point and an end time point of data to be transmitted to the information provision server 150 through the physical button or the virtual button of the input/output interface 110, the information collector 121 may transmit information collected between the start time point and the end time point to the information provision server 150 through the communication unit 130.

The information collector 121 may always store the collected data in a memory in a first in first out (FIFO) scheme, and when a user inputs a start time point and an end time point of data to be transmitted to the information provision server 150 through the physical button or the virtual button of the input/output interface 110, may transmit data collected between the corresponding time points to the information provision server 150. In various exemplary embodiments of the present disclosure, the memory and the processor 120 may be provided as one chip, or provided as separate chips.

The start time point and the end time point of the data to be transmitted to the information provision server 150 may be visualized through a moving window within the display screen of the input/output interface 110.

When information on a data storage end time point is not input by the user, the information collector 121 may transmit data collected from a time point at which a data storage start time point is input to a time point at which a pre-stored time has passed therefrom to the information provision server 150.

The information collector 121 transmits a current controller version and vehicle hardware configuration information to the information provision server 150 so that the information provision server 150 can detect functions provided in the vehicle and whether the functions are activated.

The information provision server 150 may include a private cloud based on identification information (identifier) of the vehicle or the user within a database 180 and thus store the current controller version and the vehicle hardware configuration information in the private cloud.

Meanwhile, the vehicle controller 123 is configured to control the vehicle according to a vehicle control mode received from the information provision server 150.

The vehicle controller 123 displays information on a recommended vehicle control mode received from the information provision server 150 on the display screen of the input/output interface 110, and when an input for performing the recommended vehicle control mode is received from the user, control the vehicle, based on the recommended vehicle control mode.

The input for performing the vehicle control mode may be received as the user touches the display screen.

The vehicle controller 123 may inform the user that a default user setting mode (USM) is changed to the vehicle control mode selected through the input/output interface 110.

The vehicle controller 123 may store default user setting modes for a plurality of users according to identification information of the users and change the default user setting mode to the stored vehicle control mode according to a user driving the vehicle, to control the vehicle.

Some vehicle control modes such as a charged vehicle control mode and the like may be configured so that only users who have paid subscription fee and have set the usage thereof may be used.

The vehicle controller 123 may update software to receive information on a new vehicle control mode from the information provision server 150 and configure the received information in the vehicle.

The communication unit 130 receives information on a region in which the vehicle is running, a traffic condition of the road on which the vehicle is running, and the current season and weather from a map server, a traffic information server, a weather information server, or the like, transmits information collected by the information collector 121 to the information provision server 150, and receives information on vehicle control modes from the information provision server 150.

According to an exemplary embodiment of the present disclosure, each of the information collector 121 and the vehicle controller 123 may be implemented by a processor (e.g., computer, microprocessor, CPU, ASIC, circuitry, logic circuits, etc.). Alternatively, the information collector 121 and the vehicle controller 123 may be integrated in a single processor.

The communication unit 130 is a hardware device which is implemented using various electronic circuits to transmit and receive signals over a wireless or wired connection. In an exemplary embodiment of the present disclosure, the communication unit 130 may perform communication within a means of transportation using infra-transportation means network communication technology, and may perform Vehicle-to-Infrastructure (V2I) communication with a server, infrastructure, another means of transportation, and/or the like outside a means of transportation using wireless Internet access or short-range communication technology. In the instant case, the communication within a means of transportation may be performed using Controller Area Network (CAN) communication, Local Interconnect Network (LIN) communication, FlexRay communication, and/or the like as the infra-transportation means network communication technology. Furthermore, such wireless communication technology may include wireless LAN (WLAN), Wireless Broadband (WiBro), Wi-Fi, Worldwide Interoperability for Microwave Access (WiMAX), etc. Moreover, the short-range communication technology may include Bluetooth, ZigBee, Ultra-wideband (UWB), Radio Frequency Identification (RFID), Infrared Data Association (IrDA), etc.

Meanwhile, the information provision server 150 receives information on a driving environment on the road, the vehicle, and passengers from the vehicle control device 105, determines a vehicle problem situation, determines a vehicle control mode, based on the problem situation, and transmits the vehicle control mode to the vehicle control device 105.

The information provision server 150 includes a communication unit 160, a processor 170, and a database 180.

The communication unit 160 receives information on the driving environment on the road, the vehicle, and the passengers from the vehicle control device 105 and transmits the vehicle control mode selected based thereon to the vehicle control device 105.

The communication unit 160 is a hardware device which is implemented using various electronic circuits to transmit and receive signals over a wireless or wired connection. In an exemplary embodiment of the present disclosure, the communication unit 160 may perform communication within a means of transportation using infra-transportation means network communication technology, and may perform Vehicle-to-Infrastructure (V2I) communication with a server, infrastructure, another means of transportation, and/or the like outside a means of transportation using wireless Internet access or short-range communication technology. In the instant case, the communication within a means of transportation may be performed using Controller Area Network (CAN) communication, Local Interconnect Network (LIN) communication, FlexRay communication, and/or the like as the infra-transportation means network communication technology. Furthermore, such wireless communication technology may include wireless LAN (WLAN), Wireless Broadband (WiBro), Wi-Fi, Worldwide Interoperability for Microwave Access (WiMAX), etc. Moreover, the short-range communication technology may include Bluetooth, ZigBee, Ultra-wideband (UWB), Radio Frequency Identification (RFID), Infrared Data Association (IrDA), etc.

The processor 170 is configured to determine the vehicle problem situation, based on the information on the driving environment on the road, the vehicle, and the passengers received from the vehicle control device 105, and is configured to determine the vehicle control mode, based on the problem situation.

The processor 170 includes a situation determiner 171, a control mode determiner 173, a virtual experience provider 175, and a reward provider 177.

The situation determiner 171 is configured to determine the vehicle problem situation, based on the information on the driving environment on the road, the vehicle, and the passengers received from the vehicle control device 105.

When the situation determiner 171 cannot determine the vehicle problem situation, based on the information received from the vehicle control device 105, the situation determiner 171 may make a request for additional information to the vehicle control device 105.

At the present time, the user may input the problem situation by hand or voice through the input/output interface 110 of the vehicle control device 105.

When the situation determiner 171 receives additional information from the vehicle control device 105, the situation determiner 171 may be configured to determine whether there is previously input additional information on the problem situation in connection with the currently input additional information on the problem situation in the database 180, and when there is the additional information on the previously input problem situation, update the additional information.

At the present time, the user may input information indicating that the additional information currently input through the input/output interface 110 is the information related to the previously input additional information through screen check or the like.

The additional information for which the request is made to the vehicle control device 105 may be preconfigured in the database 180 and added or changed by a user such as a system developer or the like.

The control mode determiner 173 is configured to determine the vehicle control mode to be recommended to the user, based on the vehicle problem situation determined by the situation determiner 171.

When there is a vehicle control mode that matches the vehicle problem situation determined by the situation determiner 171, the control mode determiner 173 may transmit information thereon to the vehicle control device 105 through the communication unit 160.

Meanwhile, when there is no vehicle control mode that matches the vehicle problem situation determined by the situation determiner 171, the control mode determiner 173 may transmit information indicating that there is no vehicle control mode that matches the vehicle problem situation to the vehicle control device 105 through the communication unit 160.

At the present time, the input/output interface 110 of the vehicle control device 105 may transmit a guide, for example, "I am sorry I do not include the function which you requested yet" to the user through a display or a voice message.

The information on the vehicle problem situation and the matching information for the vehicle control mode to be recommended to the user may be learned through artificial intelligence by the control mode determiner 173 based on gender, age, region, driving style.

When data required for leaning is sufficiently accumulated, it may be easy to not only determine the vehicle problem situation but also recommend the vehicle control mode according to a driving style of a driver.

The virtual experience provider 175 provides virtual experience for effects obtained when the vehicle runs in the vehicle control mode determined by the control mode determiner 173, based on information received from the vehicle control device 105.

The virtual experience provider 175 may provide virtual experience by transmitting data required for virtual experience to a mobile phone of the user, a virtual reality (VR) device, a cluster of the vehicle, audio, video, navigation (AVN), or the like.

When there is no vehicle control mode that matches the vehicle problem situation determined by the situation determiner 171, the reward provider 177 receives a process for a vehicle control procedure that can solve the vehicle problem situation from the user, and when the vehicle problem situation is improved, provide a reward to the corresponding user.

The reward may be provided through a method of exempting from the subscription fee for some vehicle control modes such as the charged vehicle control mode and the like.

According to an exemplary embodiment of the present disclosure, each of the situation determiner 171, the control mode determiner 173, the virtual experience provide 175 and the reward provider 177 may be implemented by a processor (e.g., computer, microprocessor, CPU, ASIC, circuitry, logic circuits, etc.). Alternatively, the situation determiner 171, the control mode determiner 173, the virtual experience provide 175 and the reward provider 177 may be integrated in a single processor.

Figure 2:
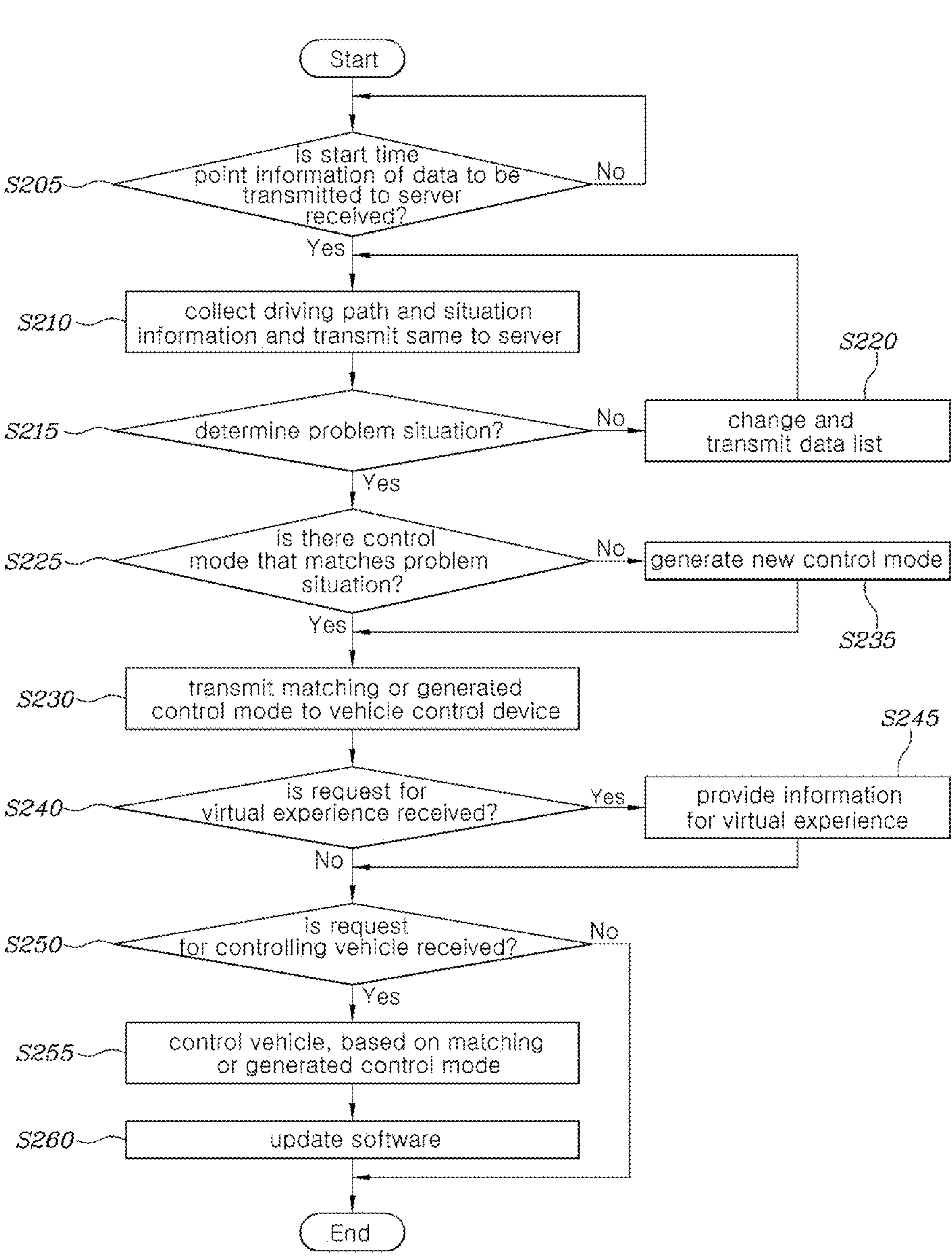
FIG. 2 is a flowchart illustrating a vehicle control mode recommendation method based on a vehicle situation according to an exemplary embodiment of the present disclosure.

FIG. 2 is a flowchart illustrating a vehicle control mode recommendation method based on a vehicle situation according to an exemplary embodiment of the present disclosure.

The vehicle control mode recommendation method according to the exemplary embodiment may be performed by the vehicle control mode recommendation system 100 of FIG. 1.

Referring to FIG. 2, the vehicle control device 105 receives information on start time point information of data to be transmitted to the information provision server 150 in S205.

The information on the start time point information of the data to be transmitted to the information provision server 150 may be received through the input/output interface 110.

The input/output interface 110 may include a physical button or a virtual button and receive an input of a start time point and an end time point of the data to be transmitted to the information provision server 150 through the button.

The end time point of the data to be transmitted to the information provision server 150 may be a time point after a pre-stored time from a time point at which information on a data storage start time point is input.

Furthermore, the vehicle control device 105 collects vehicle situation information and transmits the same to the information provision server 150 in S210.

The vehicle situation information may include information on a region in which the vehicle is running, a traffic condition of the road on which the vehicle is running, and the current season and weather.

For example, the vehicle situation information may include an external temperature of the vehicle, altitude of the road on which the vehicle is currently running, a type of the vehicle (truck, bus, SUV, or the like), and weather information such as rain, snow, wind, or the like.

The information on the region in which the vehicle is running, the traffic condition of the road on which the vehicle is running, and the current reason and weather may be received from a map server, a traffic information server, a weather information server, or the like through the communication unit 130 of the vehicle control device 105.

At the present time, data to be transmitted to the information provision server 150 may be selected among the collected information.

The start time point and the end time point of the data to be transmitted to the information provision server 150 may be input through the physical button or the virtual button of the input/output interface 110, and information collected between the start time point and the end time point may be transmitted to the information provision server 150.

The collected data may be always stored in a memory in a first in first out (FIFO) scheme, and when the user inputs a start time point and an end time point of data to be transmitted to the information provision server 150 through the physical button or the virtual button of the input/output interface 110, data collected between the corresponding time points may be transmitted to the information provision server 150.

The start time point and the end time point of the data to be transmitted to the information provision server 150 may be visualized through a moving window within the display screen of the input/output interface 110.

When information on the data storage end time point is not input by the user, data collected from a time point at which information on the data storage start time point is input to a time point after a pre-stored time therefrom may be transmitted to the information provision server 150.

At the present time, a current controller version and vehicle hardware configuration information may be transmitted to the information provision server 150 so that the information provision server 150 can detect functions provided in the vehicle and whether the functions are activated.

The information provision server 150 may include a private cloud based on identification information (identifier) of the vehicle or the user within the database 180 and thus store the current controller version and the vehicle hardware configuration information in the private cloud.

Furthermore, the information provision server 150 is configured to determine a vehicle problem situation, based on information on a driving environment of the road, the vehicle, and passengers received from the vehicle control device 105 in S215.

When the situation determiner 171 cannot determine the vehicle problem situation, based on the information received from the vehicle control device 105, the situation determiner 171 changes a list of information to be collected and transmits the changed list to the vehicle control information 105 in S220.

At the present time, the user may input the problem situation by hand or voice through the input/output interface 110 of the vehicle control device 105.

When the information provision server 150 receives additional information from the vehicle control device 105, the information provision server 150 may be configured to determine whether there is previously input additional information on the problem situation in connection with the currently input additional information on the problem situation in the database 180, and when there is the previously input additional information on the problem situation, update the additional information.

At the present time, the user may input information indicating that the additional information currently input through the input/output interface 110 is information related to the previously input additional information through screen check or the like.

The additional information for which the request is made to the vehicle control device 105 may be preconfigured in the database 180 and added or changed by a user such as a system developer or the like.

Furthermore, in S225, the information provision server 150 is configured to determine whether there is a control mode that matches the vehicle problem situation determined in S215.

When there is the control mode that matches the vehicle problem situation determined in S215, the information provision server 150 transmits information thereon to the vehicle control device 105 through the communication unit 160 in S230.

The information on the vehicle problem situation and the matching information for the vehicle control mode to be recommended to the user may be learned based on gender, age, region, driving style.

When data required for leaning is sufficiently accumulated, it may be easy to not only determine the vehicle problem situation but also recommend the vehicle control mode according to a driving style of a driver.

Meanwhile, when there is no control mode that matches the vehicle problem situation determined in S215, the information provision server 150 generates a new control mode in S235.

The new control mode may be generated through reception of a process for a vehicle control procedure that can solve the vehicle problem situation from the user.

When the vehicle problem situation is improved by the new control mode received from the user, a reward may be provided to the corresponding user.

The reward may be provided through a method of exempting from the subscription fee for some vehicle control modes such as the charged vehicle control mode and the like.

The information provision server 150 is configured to determine whether a request for virtual experience related to the matching control mode is received from the user in S240, and when the request for virtual experience is received from the user, provide information for the virtual experience in response thereto in S245.

The provided virtual experience may be virtual experience for effects obtained when the vehicle runs in the vehicle control mode determined by the control mode determiner 173, based on information received from the vehicle control device 105.

The provided virtual experience may be provided through transmission of data required for the virtual experience to a mobile phone of the user, a virtual reality (VR) device, a cluster of the vehicle, audio, video, navigation (AVN), or the like.

Furthermore, if the information provision server 150 concludes that the request for virtual experience related to the matching control mode is not received from the user in S240, the vehicle control device 105 is configured to determine whether a request for controlling the vehicle, based on the control mode that matches the vehicle problem situation or is generated by the information provision server 150 is received from the user in S250, and when a request for executing the control mode is received from the user, control the vehicle, based on the control mode that matches the vehicle problem situation or is generated in S255.

The vehicle control device 150 may transmit an inquiry about whether to control the vehicle, based on the vehicle control mode that matches the vehicle problem situation or is generated, to the user and receive a response thereto from the user, to determine whether the request for control the vehicle is received.

Furthermore, the vehicle control device 105 updates software so that information on the vehicle control mode received from the information provision server 150 may be configured in the vehicle in S260.

Meanwhile, when the vehicle control device 105 has not received the request for controlling the vehicle, based on the determination result of S250, the vehicle control device 105 ends all operations for recommending the vehicle control mode.

Figure 3:
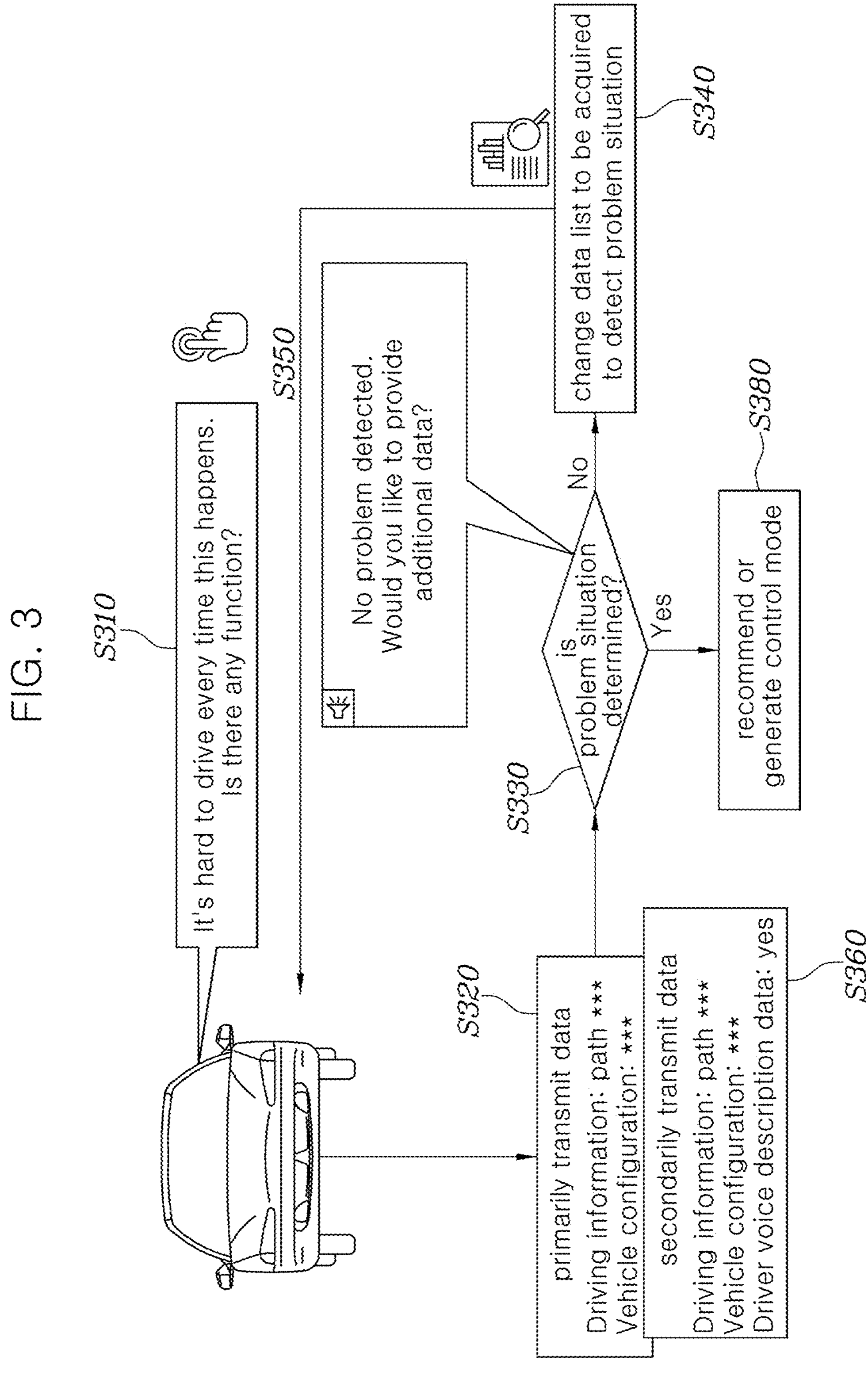
FIG. 3 illustrates an example in which a vehicle control mode recommendation method based on a vehicle driving condition is implemented according to an exemplary embodiment of the present disclosure.

FIG. 3 illustrates an example in which a vehicle control mode recommendation method based on a vehicle driving condition is implemented according to an exemplary embodiment of the present disclosure.

Referring to FIG. 3, when a problem or inconvenience occurs while driving of a vehicle including the vehicle control device 105 in S310, it may be identified that vehicle situation information may be primarily transmitted to the information provision server 150 in S320, it may be determined whether a problem situation may be determined by the information provision server 150 in S330, a list of data to be obtained by the vehicle control device 105 may be changed to detect the problem situation by the information provision server 150 when the problem situation may be determined in S340, a request is made to the vehicle in S350, and the vehicle may transmit again the vehicle situation information including voice description data of the driver to the information provision server 150 in S360. When the problem situation is detected by the information provision server 150, based on the result, the information provision server 150 may identify that the control mode according thereto may be recommended or generated in S380.

Figure 4:
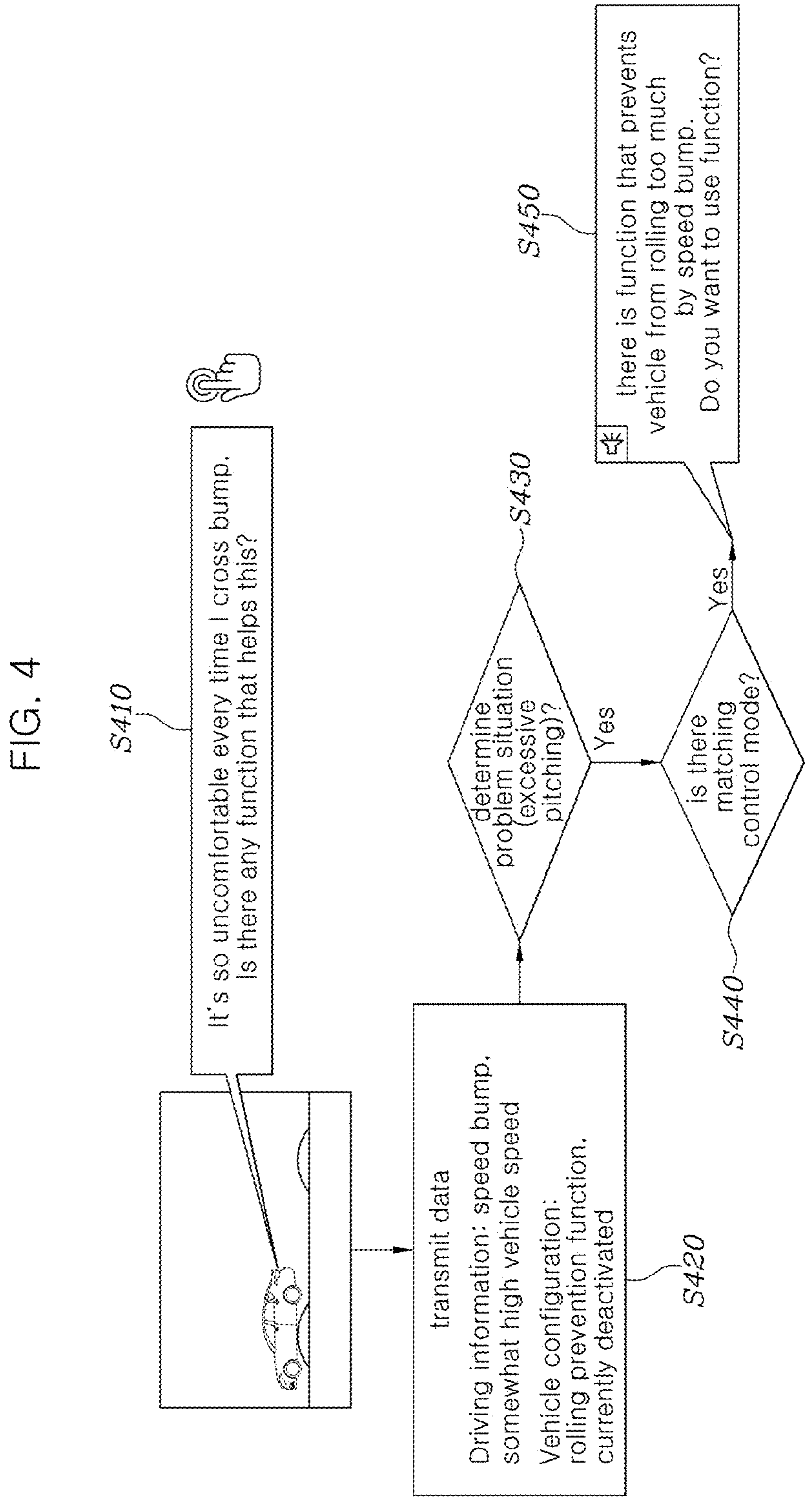
FIG. 4 illustrates another example in which the vehicle control mode recommendation method based on the vehicle driving condition is implemented according to an exemplary embodiment of the present disclosure.

FIG. 4 illustrates another example, in which the vehicle control mode recommendation method based on the vehicle driving condition is implemented according to an exemplary embodiment of the present disclosure.

Referring to FIG. 4, when a vehicle is rolling whenever the vehicle including the vehicle control device 105 goes over a speed bump while driving of the vehicle in S410, it may be identified that, to transmit vehicle driving information and vehicle configuration information to the information provision server 150 in S420, the information provision server 150 may be configured to determine a problem situation in S430, determine whether there is a control mode that matches the vehicle problem situation in S440, and when there is the control mode that matches the vehicle problem situation, transmit an inquiry about whether to use the matching control mode to the user in S450.

For example, to receive information indicating whether the recommended control mode is used from the user, the input/output interface 110 of the vehicle control device 105 may transmit an inquiry of "There is a function that helps prevent the vehicle from rolling too much by a speed bump. Would you like to use the function?".

FIG. 5 illustrates another example in which the vehicle control mode recommendation method based on the vehicle driving condition is implemented according to an exemplary embodiment of the present disclosure.

Referring to FIG. 5, when inconvenience occurs due to repeated braking of a vehicle including the vehicle control device 105 while an auto hold function is activated when the vehicle parks in S510, it may be identified that, when vehicle driving information and vehicle configuration information are transmitted to the information provision server 150 in S520, the information provision server 150 may be configured to determine a problem situation in S530, determine whether there is a control mode that matches the vehicle problem situation in S540, generate a new control mode suitable for the vehicle problem situation to a driver of the user when there is no control mode that matches the vehicle problem situation in S550, determine whether a request for virtual experience therefor is received in S560, and provide the virtual experience when the request for the virtual experience is received in S570.

Figure 6:
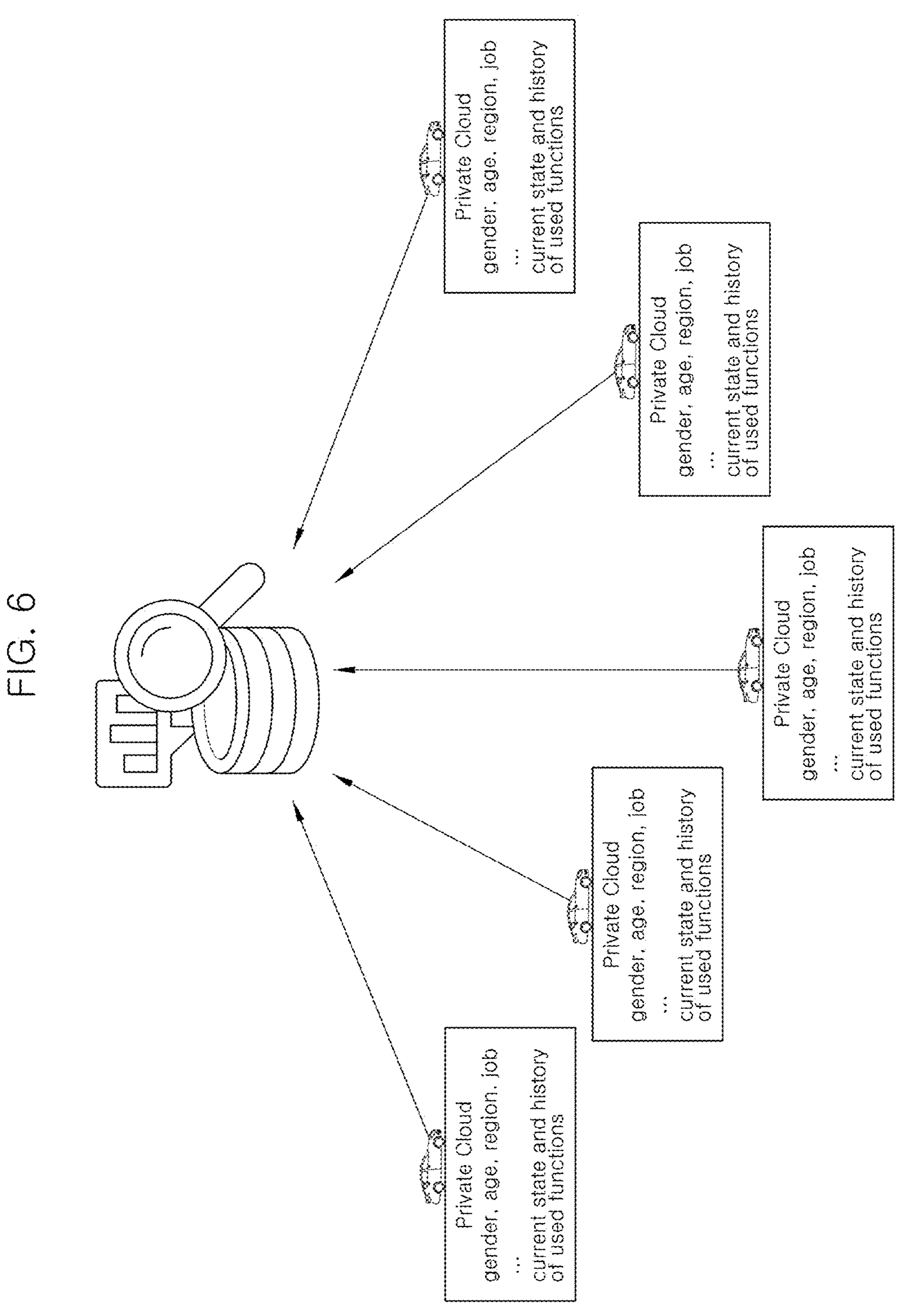
FIG. 6 illustrates an example in which information on a vehicle control mode requested or used according to a vehicle driving condition is collected according to an exemplary embodiment of the present disclosure.

FIG. 6 illustrates an example in which information on vehicle control modes requested or used according to vehicle driving conditions is collected according to an exemplary embodiment of the present disclosure.

Referring to FIG. 6, it may be identified that information on gender, age, region, and job of the driver, a current state indicating whether a vehicle driving mode transmitted by the driver is used, and a history thereof may be transmitted to a server by each vehicle.

At the present time, the server may learn artificial intelligence based on accumulated data, and thus accuracy of function recommendation may be further increased.

Furthermore, real life needs of customers may be grasped and customized functions for many people may be developed.

Furthermore, although breakdown is not confirmed, data on situations that cause inconvenience to customers may be easily obtained.

According to the exemplary embodiments of the present disclosure described up to now, the user is allowed to actively apply the vehicle control technology according to the vehicle condition, so customers may be secured.

The user can apply or release a desired function at a desired time point.

It is possible to increase customer satisfaction by securing various driving data of drivers and using the same to develop the technology.

Furthermore, it is possible to provide enjoyment by allowing the user to virtually experience functions selected by the user.

Furthermore, it is possible to generate additional revenue by providing new functions of the vehicle.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

Hereinafter, the fact that pieces of hardware are coupled operably may include the fact that a direct and/or indirect connection between the pieces of hardware is established by wired and/or wirelessly.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of recommending a vehicle control mode, the method comprising:

receiving, by a processor, situation information collected from a vehicle for a predetermined time period, based on a data list generated by the vehicle;

determining, by the processor, a problem situation of the vehicle, based on the collected situation information; and selecting, by the processor, the vehicle control mode that matches the problem situation of the vehicle from among a plurality of pre-stored vehicle control modes and transmitting the selected vehicle control mode to the vehicle; and controlling the vehicle according to the selected vehicle control mode, wherein the situation information includes controller version information and vehicle hardware configuration information, and wherein the vehicle control mode is selected based on functions available in the vehicle as determined from the controller version information and the vehicle hardware configuration information.

2. The method of claim 1, wherein the data list includes a driving path of the vehicle, main data of the vehicle, and the controller version information of the vehicle.

3. The method of claim 1, further including, in a situation that it is not possible to determine the problem situation of the vehicle, changing the data list and transmitting the changed data list to the vehicle.

4. The method of claim 1, further including, in a situation that there is no vehicle control mode that matches the problem situation of the vehicle in the plurality of pre-stored vehicle control modes, generating a new vehicle control mode.

5. The method of claim 4, wherein the new vehicle control mode is generated by receiving a process for a control procedure of the vehicle configured for solving the problem situation of the vehicle from a user.

6. The method of claim 1, wherein, in a situation that a request for virtual experience related to the matching vehicle control mode is received from a user, information for the virtual experience is provided in response thereto.

7. The method of claim 1, wherein the data list is generated based on a region in which the vehicle is running, a type of the vehicle, and current season and weather.

8. A server for providing information, the server comprising:

a communication unit configured to receive situation information collected from a vehicle for a predetermined time period, based on a data list generated by the vehicle; and a processor operatively connected to the communication unit and configured to:

determine a problem situation of the vehicle, based on the collected situation information;

select a vehicle control mode that matches the problem situation of the vehicle from among a plurality of pre-stored vehicle control modes; and transmit the selected vehicle control mode to the vehicle for controlling the vehicle according to the selected vehicle control mode, wherein the situation information includes controller version information and vehicle hardware configuration information, and wherein the vehicle control mode is selected based on functions available in the vehicle as determined from the controller version information and the vehicle hardware configuration information.

9. The server of claim 8, wherein the data list includes a driving path of the vehicle, main data of the vehicle, and information on the controller version information of the vehicle.

10. The server of claim 8, wherein the processor is configured to, in a situation that it is not possible to determine the problem situation of the vehicle, change the data list and transmit the changed data list to the vehicle.

11. The server of claim 8, wherein the processor is configured to, in a situation that there is no vehicle control mode that matches the problem situation of the vehicle in the plurality of pre-stored vehicle control modes, generate a new vehicle control mode.

12. The server of claim 11, wherein the new vehicle control mode is generated by receiving a process for a control procedure of the vehicle configured for solving the problem situation of the vehicle from a user.

13. The server of claim 8, wherein the processor is configured to, in a situation that a request for virtual experience related to the matching vehicle control mode is received from a user, provide information for the virtual experience in response thereto.

14. The server of claim 8, wherein the data list is generated based on a region in which the vehicle is running, a type of the vehicle, and current season and weather.

15. A vehicle control mode recommendation system for providing information, the system comprising:

a vehicle control device of a vehicle, wherein the vehicle control device includes:

a communication unit configured to receive situation information; and a controller including a processor connected to the communication unit and configured to generate a data list;

a server including:

a communication unit operatively connected to the communication unit of the vehicle control device and configured to receive the situation information collected from the processor of the vehicle control device for a predetermined time period, through the communication unit of the vehicle control device, based on the data list received from the processor of the vehicle control device; and a processor configured to:

determine a problem situation of the vehicle, based on the received situation information, and select a vehicle control mode that matches the problem situation of the vehicle from among a plurality of pre-stored vehicle control modes, and transmit the vehicle control mode to the vehicle control device via the communication unit of the server, wherein the processor of the vehicle control device is configured to control the vehicle according to the vehicle control mode, and wherein the situation information includes controller version information and vehicle hardware configuration information, and wherein the vehicle control mode is selected based on functions available in the vehicle as determined from the controller version information and the vehicle hardware configuration information.

16. The system of claim 15, wherein the data list includes a driving path of the vehicle, data of the vehicle, and information on the controller version information of the vehicle control device.

17. The system of claim 15, wherein the processor of the server is configured to, in a situation that it is not possible to determine the problem situation of the vehicle control device, change the data list and transmit the changed data list to the vehicle control device.

18. The system of claim 15, wherein the processor of the server is configured to, in a situation that there is no vehicle control mode that matches the problem situation of the vehicle in the plurality of pre-stored vehicle control modes, generate a new vehicle control mode.

19. The system of claim 18, wherein the new vehicle control mode is generated by receiving a process for a control procedure of the vehicle configured for solving the problem situation of the vehicle from a user.

20. The system of claim 15, wherein the processor of the server is configured to, in a situation that a request for virtual experience related to the matching vehicle control mode is received from a user, provide information for the virtual experience in response thereto.

* * * * *